No. 673,971. Patented May 14, 1901.
C. A. BARTLIFF.
PIPE JOINT.
(Application filed July 7, 1900.)
(No Model.)
Fig. 1. Fig. 4. Fig. 2.
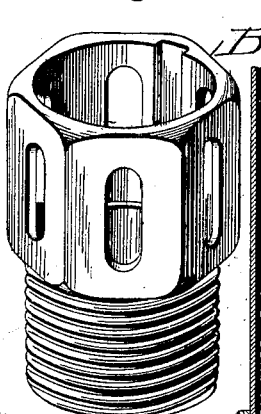
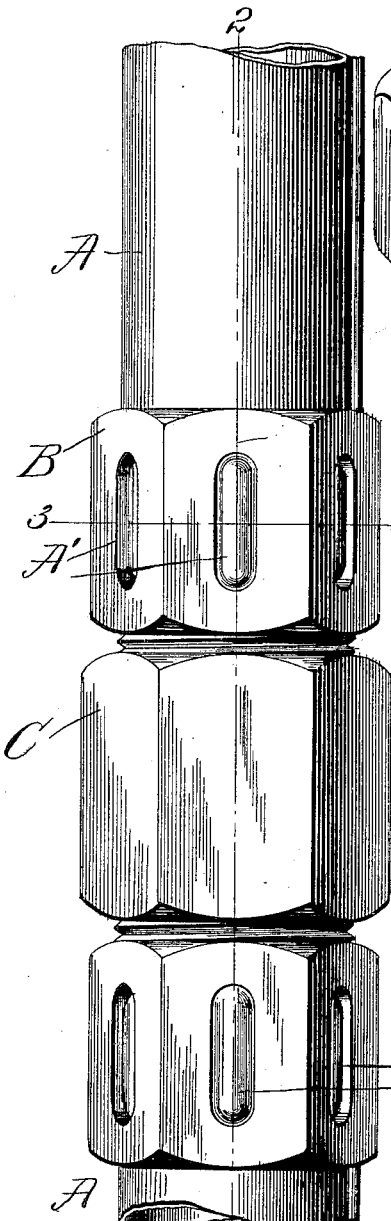
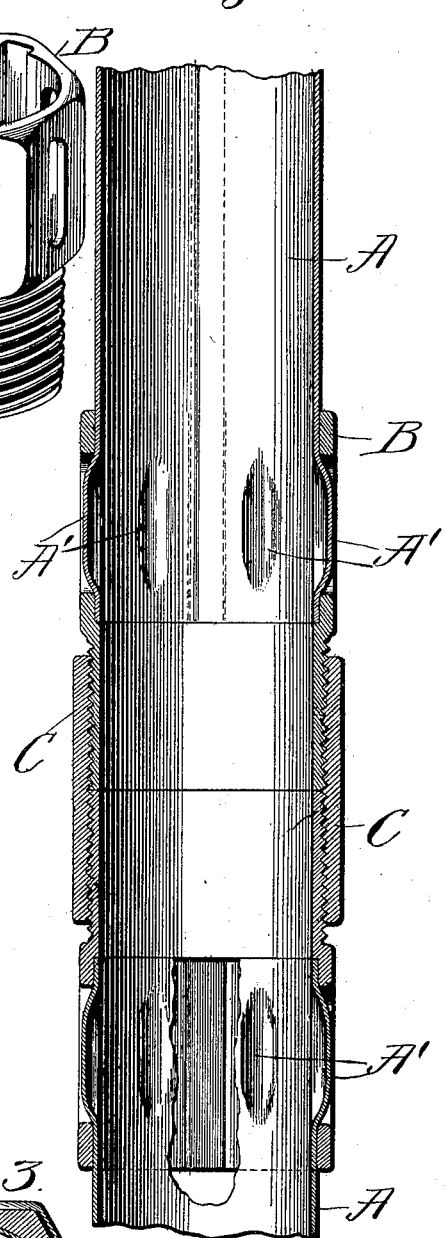
Fig. 3.
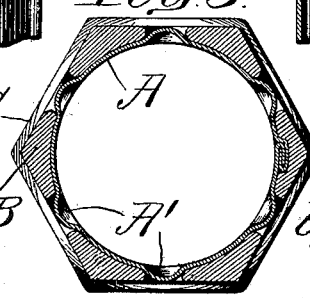
Attest: Inventor:
Chas. A. Bartliff,
by Bakewell & Cornwall
Att'ys.
THE NORRIS PETERS CO., PHOTO-LITHO., WASHINGTON, D. C.

UNITED STATES PATENT OFFICE.

CHARLES A. BARTLIFF, OF ST. LOUIS, MISSOURI.

PIPE-JOINT.

SPECIFICATION forming part of Letters Patent No. 673,971, dated May 14, 1901.

Application filed July 7, 1900. Serial No. 22,803. No model.

*To all whom it may concern:*

Be it known that I, CHARLES A. BARTLIFF, a citizen of the United States, residing at the city of St. Louis, State of Missouri, have invented a certain new and useful Improvement in Pipe-Joints, of which the following is a full, clear, and exact description, such as will enable others skilled in the art to which it appertains to make and use the same, reference being had to the accompanying drawings, forming part of this specification, in which—

Figure 1 is a side elevational view of my improved pipe-joint. Fig. 2 is a vertical longitudinal sectional view of the same, taken on line 2 2, Fig. 1. Fig. 3 is a horizontal sectional view on line 3 3, Fig. 1; and Fig. 4 is a detail perspective view of the nipple employed in my improved pipe-joint.

This invention relates to a new and useful improvement in pipe-joints, being designed particularly for use in connection with what is known as "galvanized-iron pipe," the joints being formed of wrought-iron or other suitable material secured in position on the ends of the sheet-metal pipe.

The object of my present invention is to construct a water-tight pipe of sheet metal, the ends thereof being provided with nipples secured firmly in position against rotary and longitudinal movements, said nipples being designed to coöperate with a suitable coupling.

The invention consists in the construction, arrangement, and combination of the several parts, all as will hereinafter be described and afterward pointed out in the claims.

In the drawings, A indicates the body portion of the pipe, which is preferably formed of sheet metal, the edges thereof being bent to form the usual lock-seam.

B indicates the nipple, whose interior bore is formed of two diameters, the larger of which is provided with a seat or groove to receive the lock-seam of the pipe when the end of the pipe is introduced into the larger bore, said pipe abutting against the shoulder formed by the differences in the interior diameters of the nipple. The outer face of the enlarged portion of the nipple is preferably polygonal in shape to form a head with which an ordinary wrench may coöperate. The walls or facets of this head are provided with openings, preferably elongated longitudinally, and when the pipe is introduced in position the walls at the end of the pipe opposite these openings are forced outwardly, as shown, forming offsets A', which substantially fit in these openings and prevent the nipple from rotating or moving longitudinally the pipe. The end of the nipple is threaded and is designed to coöperate with a coupling C, said coupling preferably having its outer face polygonal in shape for the application of an ordinary wrench.

When the pipe A has a nipple arranged on its end or a nipple on each end, as the case may be, the walls of the pipe are bulged outwardly into the openings in the head of the nipple, and then the pipe, with its attached nipples, is dipped into an acid-bath prior to its introduction into a galvanizing-bath. This galvanizing-bath is composed of the usual ingredients, and when the molten metal constituting the galvanizing-bath comes in contact with the pipe and nipples the metal of the bath will run into the lock-seam of the pipe to seal the same into the spaces between the ends of the pipe and the nipples around the locking projections of the pipe and into their receiving-slots, firmly securing the nipples in position substantially in the same manner as if solder were used.

From the above it will be seen that the final galvanizing treatment not only provides a bond between the nipples and the pipe, besides serving as a seal for the lock-seam of the pipe, but it also galvanizes the pipe, making the same much stronger. This is advantageous in that where "black" sheet metal is used in the manufacture of the pipe (by "black" is meant ungalvanized sheet metal) soft steel may be employed, which steel may be tempered in the galvanizing process. Where galvanized metal is used to form the pipe, the bending of the metal into shape frequently cracks the galvanized coating either inside or outside of the pipe, so as to expose the base metal to the action of rust and corrosive gases. It is of course obvious that a pipe having its galvanized coating imperfect will last but a short time. Upon the regalvanization of the pipe to seal the lock-seam and provide a bond for the nipples any defects or imperfections resulting from the treatment of the galvanized metal of which the pipe may be made are cured.

The pipes provided with nipples, as above described, are designed to be made in sections of different lengths and sizes, each section having a nipple at each end.

Pipe so made is much cheaper and lighter than wrought-iron pipe, is air-tight, and will last as long as the wrought-iron pipe now most generally employed.

My improved pipe is primarily designed for use as tubing for pumps and deep wells; but it is obvious that there are many uses to which the same may be put.

Having thus described my invention, what I claim, and desire to secure by Letters Patent, is—

1. The combination with a shouldered nipple, of a pipe which is introduced into the larger bore thereof and against said shoulder, projections on said pipe for engaging the nipple and preventing independent rotation and longitudinal movement between the parts, and a metallic bond which is introduced in a molten state into the spaces between said nipple and pipe; substantially as described.

2. The combination with a nipple, formed with one or more radial perforations, of a pipe which is introduced into said nipple, the wall of said pipe being expanded radially to engage and interlock with said radial perforations in said nipple whereby independent rotary and longitudinal movement between the parts is prevented; substantially as described.

3. The combination with a nipple formed with a hexagonal head, openings through the walls thereof, a pipe introduced into the head of said nipple, the walls of said pipe being expanded into the openings in the head of the nipple, and molten metal which is introduced between the nipple and pipe for forming a bond; substantially as described.

4. The combination with a sheet-metal pipe formed with a lock-seam, of a nipple introduced over the end of said pipe, said nipple having a key-seat for accommodating said lock-seam, the walls of said pipe being expanded into openings or recesses in the nipple to lock the parts together, and a metallic bond which is introduced between the nipple and the pipe; substantially as described.

5. The combination with a sheet-metal pipe formed with a lock-seam, of a nipple arranged on the end thereof, the walls of said pipe being expanded laterally to engage recesses or openings in the nipple, the entire structure so formed being submerged in a bath of molten metal which is deposited in the crevices to seal the lock-seam and provide a bond between the nipple and the pipe; substantially as described.

In testimony whereof I hereunto affix my signature, in the presence of two witnesses, this 5th day of July, 1900.

CHARLES A. BARTLIFF.

Witnesses:
WM. H. SCOTT,
F. R. CORNWALL.